United States Patent
Kim

(10) Patent No.: US 8,568,919 B2
(45) Date of Patent: Oct. 29, 2013

(54) RECHARGEABLE BATTERY

(75) Inventor: Duk-Jung Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 474 days.

(21) Appl. No.: 12/929,210

(22) Filed: Jan. 7, 2011

(65) Prior Publication Data

US 2012/0028112 A1 Feb. 2, 2012

(30) Foreign Application Priority Data

Jul. 30, 2010 (KR) .................. 10-2010-0074209

(51) Int. Cl.
*H01M 2/30* (2006.01)

(52) U.S. Cl.
USPC ..................... 429/182; 429/178; 429/181

(58) Field of Classification Search
CPC ....................................... H01M 2/30
USPC .................. 429/182, 178, 181, 183, 184
See application file for complete search history.

(56) References Cited

U.S. PATENT DOCUMENTS

| | | | | |
|---|---|---|---|---|
| 4,207,390 A | * | 6/1980 | Oehrlein et al. | 429/179 |
| 7,163,763 B2 | * | 1/2007 | Spiegelberg et al. | 429/178 |
| 7,642,008 B2 | | 1/2010 | Kim et al. | |
| 2006/0115727 A1 | * | 6/2006 | Kim et al. | 429/181 |
| 2010/0143786 A1 | * | 6/2010 | Kim | 429/158 |

FOREIGN PATENT DOCUMENTS

JP 2000-215880 A 8/2000
KR 10 2006-0060801 A 6/2006

* cited by examiner

*Primary Examiner* — Carlos Barcena
*Assistant Examiner* — Michael Dignan
(74) *Attorney, Agent, or Firm* — Lee & Morse, P.C.

(57) ABSTRACT

A rechargeable battery including an electrode assembly including a positive electrode, a negative electrode, and a separator therebetween; a case housing the electrode assembly; a cap plate sealing an opening of the case; and an electrode terminal installed in the cap plate, wherein the electrode terminal includes a first terminal section in a terminal hole of the cap plate, the first terminal being connected to the electrode assembly in the case and including a protruding portion that protrudes outwardly from the cap plate, the protruding portion having a receiving portion therein, a second terminal section in the receiving portion, the second terminal section protruding outwardly from the receiving portion, and a fastening member between an inner peripheral surface of the receiving portion and the second terminal section, the fastening member fastening the first terminal section and the second terminal section to each other.

13 Claims, 8 Drawing Sheets

RECHARGEABLE BATTERY

BACKGROUND

1. Field

Embodiments relate to a rechargeable battery.

2. Description of the Related Art

A rechargeable battery may include an electrode assembly having a jelly roll shape in which a separator is interposed between a positive electrode and a negative electrode and wound, a case housing the electrode assembly, a cap plate sealing an opening of the case, and an electrode terminal electrically connected to the electrode assembly.

For example, the electrode terminal may be connected to the positive electrode and the negative electrode of the electrode assembly through a lead tab in the case. The electrode terminal may protrude outwardly from the cap plate through a terminal hole in the cap plate. The electrode terminal may include a bolt portion outside of the cap plate. A bus bar may be installed at the bolt portion and a nut may be fastened to the bolt portion such that the bus bar connects neighboring rechargeable batteries to each other in series or in parallel.

Thus, the electrode terminal may be fastened by the bolt and the nut outside of the case and the electrode terminal may be connected to the lead tab by, e.g., a caulking, riveting, or welding method, in the case. For example, the electrode terminal may have fastening structures of different properties at both sides thereof.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery.

At least one of the above and other features and advantages may be realized by providing a rechargeable battery including an electrode assembly including a positive electrode, a negative electrode, and a separator therebetween; a case housing the electrode assembly; a cap plate sealing an opening of the case; and an electrode terminal installed in the cap plate, wherein the electrode terminal includes a first terminal section in a terminal hole of the cap plate, the first terminal section being connected to the electrode assembly in the case and including a protruding portion that protrudes outwardly from the cap plate, the protruding portion having a receiving portion therein, a second terminal section in the receiving portion, the second terminal section protruding outwardly from the receiving portion, and a fastening member between an inner peripheral surface of the receiving portion and the second terminal section, the fastening member fastening the first terminal section and the second terminal section to each other.

The receiving portion may be formed by a cylindrical space, the receiving portion may include a concave rotation-preventing groove protruding outwardly in a radial direction, and the second terminal section may include a rotation-preventing projection, the rotation-preventing projection being convex outwardly in the radial direction and being coupled to the rotation-preventing groove.

The receiving portion may include a plurality of the rotation-prevention grooves, the second terminal section may include a plurality of the rotation-preventing projections, and the plurality of rotation-preventing grooves and rotation-preventing projections may be arranged at regular intervals along a circumferential direction of the receiving portion and are correspondingly coupled to each other.

The fastening member may include a ring portion that closely contacts the rotation-preventing projection, and a fastening protrusion that protrudes from the ring portion, the fastening protrusion being coupled to a fastening groove on the inner peripheral surface of the receiving portion, which inner peripheral surface faces the ring portion.

The fastening groove may include a horizontal bottom surface that extends outwardly in the radial direction from the inner peripheral surface of the receiving portion, and the fastening protrusion may include a horizontal top surface that closely contacts the horizontal bottom surface of the fastening groove, and an inclined surface that is inclined toward a lower part of the ring portion from an end of the horizontal top surface.

The fastening groove may extend continuously along a circumference of the inner peripheral surface of the receiving portion, and the fastening protrusion may extend continuously along a circumference of an outer peripheral surface of the ring portion.

The first terminal section and the second terminal section may be made of a conductive material, and the fastening member may be made of a resin injection material.

The fastening member may include a ring portion that closely contacts the rotation-preventing projection, a fastening protrusion that protrudes from the ring portion, the fastening protrusion being coupled to a fastening groove on the inner peripheral surface of the receiving portion, which inner peripheral portion faces the ring portion, and an auxiliary rotation-preventing projection that protrudes from the ring portion, the auxiliary rotation-preventing projection being coupled to the rotation-preventing groove.

The receiving portion may include a plurality of the rotation-prevention grooves and a plurality of the fastening grooves, and the fastening grooves and the rotation-preventing grooves may be alternately disposed in along a circumferential direction of the receiving portion.

The receiving portion may further include a separation-preventing groove that extends from the rotation-preventing groove along the circumferential direction, and the ring portion may include a projection receiving groove that contacts the rotation-preventing projection to correspond to the separation-preventing groove so that the rotation-preventing projection is inserted into the separation-preventing groove.

The ring portion may include a plurality of fastening protrusions, the plurality of fastening protrusions being on an outer circumferential surface of the ring portion and corresponding to the fastening grooves.

The fastening groove may include a horizontal bottom surface extending outwardly in the radial direction from the inner peripheral surface of the receiving portion, the fastening protrusion may include a horizontal top surface that closely contacts the horizontal bottom surface, and an inclined surface that is inclined toward a lower part of the ring portion from an end of the horizontal top surface, and the fastening groove and the fastening protrusion may have about the same length in the circumferential direction.

The rechargeable battery may further include an outer insulator between an outer part of the first terminal section and the cap plate; and an inner insulator between a lead tab of the electrode assembly connected to an inner part of the first terminal section and the cap plate.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
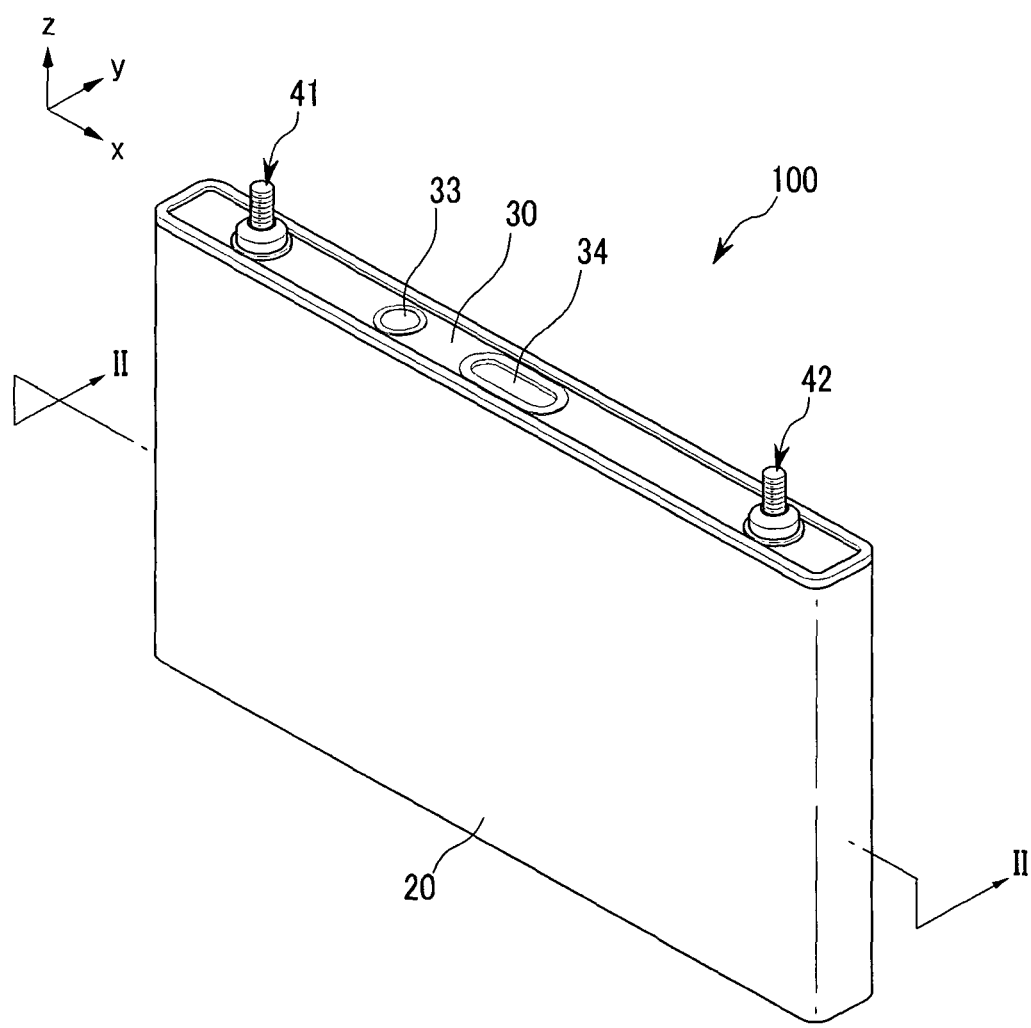
FIG. 1 illustrates a perspective view of a rechargeable battery according to an embodiment.

Korean Patent Application No. 10-2010-0074209, filed on Jul. 30, 2010, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
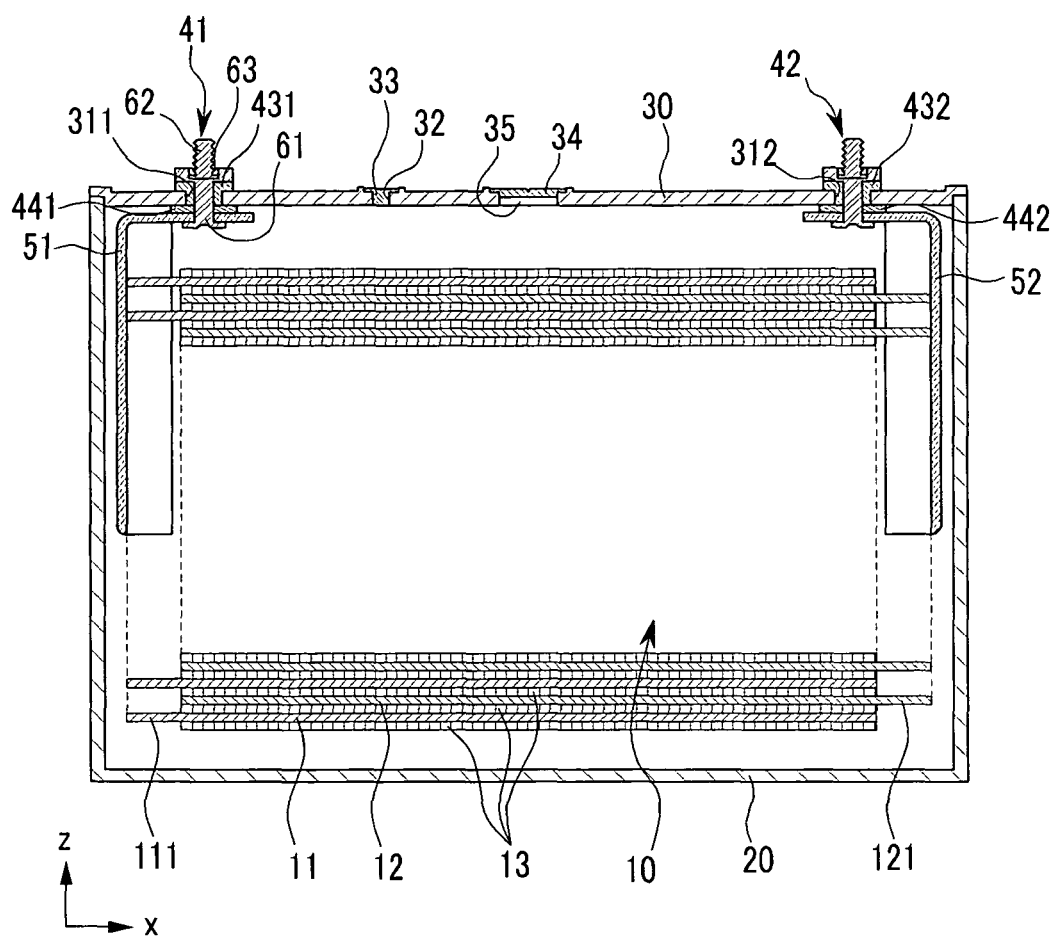
FIG. 2 illustrates a cross-sectional view of the rechargeable battery of FIG. 1 taken along line II-II.

FIG. 1 illustrates a perspective view of a rechargeable battery according to an embodiment. FIG. 2 illustrates a cross-sectional view of the rechargeable battery of FIG. 1 taken along line II-II. Referring to FIGS. 1 and 2, the rechargeable battery 100 may include a case 20 housing an electrode assembly 10, a cap plate 30 sealing an opening at one end of the case 20, electrode terminals 41 and 42 installed in the cap plate 30, and lead tabs 51 and 52 connecting the electrode terminals 41 and 42 to the electrode assembly 10.

For example, the electrode assembly 10 may include an insulating separator 13 and a positive electrode 11 and a negative electrode 12 on both surfaces of the separator 13. The electrode assembly 10 may have a jelly roll shape formed by winding the positive electrode 11, the negative electrode 12, and the separator 13 together.

In an implementation, the electrode assembly 10 may be assembled by stacking the negative electrode 12 and the positive electrode 11, which may be made of a single metal plate, with the separator 13 interposed therebetween. In another implementation, the electrode assembly 10 may be assembled by bending and stacking the negative electrode 12, the separator 13, and the positive electrode 11 in a zigzag manner (not shown).

The positive electrode 11 and the negative electrode 12 may be formed by coating a current collector formed of a thin metal plate with an active material. Thus, each of the positive electrode 11 and the negative electrode 12 may include a coated region where the current collector is coated with the active material and uncoated regions 111 and 121 where portions of the current collector not coated with the active material is exposed. The coated region may occupy most of each area of the positive electrode 11 and the negative electrode 12; and the uncoated regions 111 and 121 may be formed at sides of the coated regions of the electrode assembly 10 in a jelly roll state, respectively.

The case 20 may form an entire exterior of the rechargeable battery 100 and may be made of a conductive metal, e.g., aluminum, an aluminum alloy, or nickel-plated steel. The case 20 may provide a space for housing the electrode assembly 10.

For example, the case 20 may have a rectangular parallelepiped angular shape having an opening at one side thereof to receive the electrode assembly 10 having a shape corresponding to the rectangular parallelepiped. The opening may face an upper direction (z-axis direction) in the case 20 shown in FIGS. 1 and 2.

The cap plate 30 may be formed of a thin, e.g., steel, sheet and may be installed at the opening of the case 20 to seal the case 20. Thus, the cap plate 30 may separate an outer part and an inner part of the case 20 from each other and further, as desired, may connect the outer part and the inner part to each other.

The cap plate 30 may include elements facilitating formation and operation of the rechargeable battery 100, e.g., terminal holes 311 and 312 exposing parts of the electrode terminals 41 and 42, respectively, an electrolyte injection hole 32 for injecting an electrolyte solution, and a vent hole 35 for ensuring the stability of the rechargeable battery 100 when an internal pressure of the rechargeable battery 100 excessively increases.

The electrolyte injection hole 32 may facilitate injection of the electrolyte solution into the case 20 while the cap plate 30 is coupled to the case 20. After the electrolyte solution is injected into the case 20, the electrolyte injection hole 32 may be sealed with a sealing plug 33.

During normal operation of the rechargeable battery 100, the vent hole 35 may maintain a closed state and may be sealed with a vent plate 34 so as to be opened when internal pressure exceeds a predetermined internal pressure. For example, the vent plate 34 may be made of a thin plate material that is thinner than the cap plate 30 and may be welded to a circumference of the vent hole 35.

Gas may be generated in the inner part of the rechargeable battery 100 by charging and discharging operations of the electrode assembly 10; and the gas may increase the internal pressure of the case 20. When the internal pressure of the rechargeable battery 100 reaches or exceeds a predetermined value, the vent plate 34 may burst to discharge the gas, thereby preventing an explosion of the rechargeable battery 100.

The terminal holes 311 and 312 may facilitate installation of the electrode terminals 41 and 42 through the cap plate 30. For example, the electrode terminals 41 and 42 may be electrically connected to the positive electrode 11 and the negative electrode 12 of the electrode assembly 10 through the terminal holes 311 and 312 to and portions of the positive electrode 11 and the negative electrode 12 may be exposed outside of the cap plate 30.

For example, the electrode terminals 41 and 42 may be installed in the terminal holes 311 and 312 through outer insulators 431 and 432 and inner insulators 441 and 442 to be electrically insulated from the cap plate 30.

The terminal holes 311 and 312, the outer insulators 431 and 432, and the inner insulators 441 and 442 may have the same structure relative to the two electrode terminals 41 and 42. Thus, one electrode terminal 41, the terminal hole 311, and the outer insulator 431, and the inner insulator 441 will be described as an example.

The outer insulator 431 may be inserted into the terminal hole 311 outside of the cap plate 30 to electrically insulate the electrode terminal 41 and the cap plate 30 from each other. For example, the outer insulator 431 may electrically insulate an outer surface of the electrode terminal 41 and an outer surface of the cap plate 30 from each other and may insulate the outer surface of the electrode terminal 41 and an inner surface of the terminal hole 311 from each other.

The inner insulator 441 may correspond to the terminal hole 311 inside of the cap plate 30 to electrically insulate the cap plate 30 and the lead tab 51 from each other. For example, the inner insulator 441 may electrically insulate an inner surface of the cap plate 30 and a top surface of the lead tab 51 from each other and may insulate the outer surface of the electrode terminal 41 and the inner surface of the cap plate 30 from each other.

The electrode terminals 41 and 42 connected to the positive electrode 11 and the negative electrode 12 of the electrode assembly 10, respectively, may have the same structure. Therefore, hereinafter, the electrode terminal 42 connected to the negative electrode 12 will not be described; and the electrode terminal 41 connected to the positive electrode 11 will be described.

Figure 3:
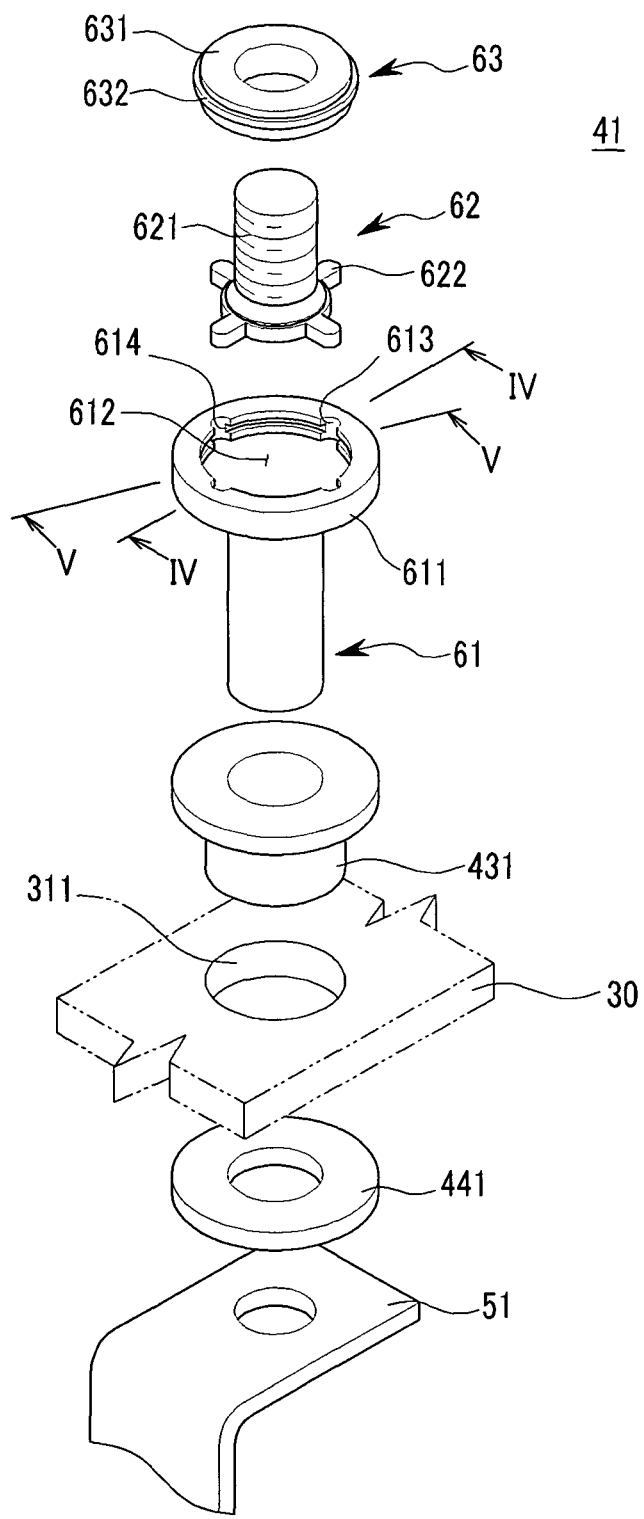
FIG. 3 illustrates an exploded perspective view of an electrode terminal, a cap plate, and a lead tab of the rechargeable battery of FIG. 1.

FIG. 3 illustrates an exploded perspective view of an electrode terminal, a cap plate, and a lead tab of the rechargeable battery of FIG. 1. Referring to FIGS. 2 and 3, the electrode terminal 41 may include a first terminal section 61 in the terminal hole 311 of the cap plate 30, a second terminal section 62 coupled to the first terminal section 61, and a fastening member 63 fastening the first and second terminal sections 61 and 62 to each other. For example, the electrode terminal 41 may have a structure in which parts having fastening structures with different properties are separated into the first terminal section 61 and the second terminal section 62, which are fastened to each other.

For example, the first terminal section 61 may be connected to the lead tab 51 by caulking, riveting, or welding inside of the cap plate 30. For example, the first terminal section 61 may be transformed while it is connected to the lead tab 51. The second terminal section 62 may include a bolt portion 621 outside of the cap plate 30.

The first and second terminal sections 61 and 62 may be fastened to each other, a bus bar (not shown) may be installed at the bolt portion 621, and a nut (not shown) may be fastened to the bolt portion 621 to connect two neighboring rechargeable batteries 100 to each other in series or in parallel. Therefore, the connection process of the first terminal section 61 and the lead tab 51 may not influence the second terminal section 62 and the bolt portion 621. For example, processing constraints of the first terminal section 61 may influence only the first terminal section 61 and may not influence the second terminal section 62.

The first terminal section 61 may be installed in the terminal hole 311 with the outer insulator 431 and the inner insulator 441 interposed therebetween to be electrically insulated from the cap plate 30.

The outer insulator 431 may be inserted into the terminal hole 311 outside of the cap plate 30 to electrically insulate the first terminal section 61 and the cap plate 30 from each other. For example, as described above, the outer insulator 431 may electrically insulate the outer surface of the first terminal section 61 and the outer surface of the cap plate 30 from each other and may insulate the outer surface of the first terminal section 61 and the inner surface of the terminal hole 311 from each other.

The inner insulator 441 may correspond to the terminal hole 311 inside of the cap plate 30 to electrically insulate the cap plate 30 and the lead tab 51 from each other and the first terminal section 61 and the cap plate 30 from each other. For example, as described above, the inner insulator 441 may electrically insulate the inner surface of the cap plate 30 and the top surface of the lead tab 51 from each other and may insulate the outer surface of the first terminal section 61 and the inner surface of the cap plate 30 from each other. Further, the inner insulator 441 may seal a space between the terminal hole 311 and the first terminal section 61.

Figure 4:
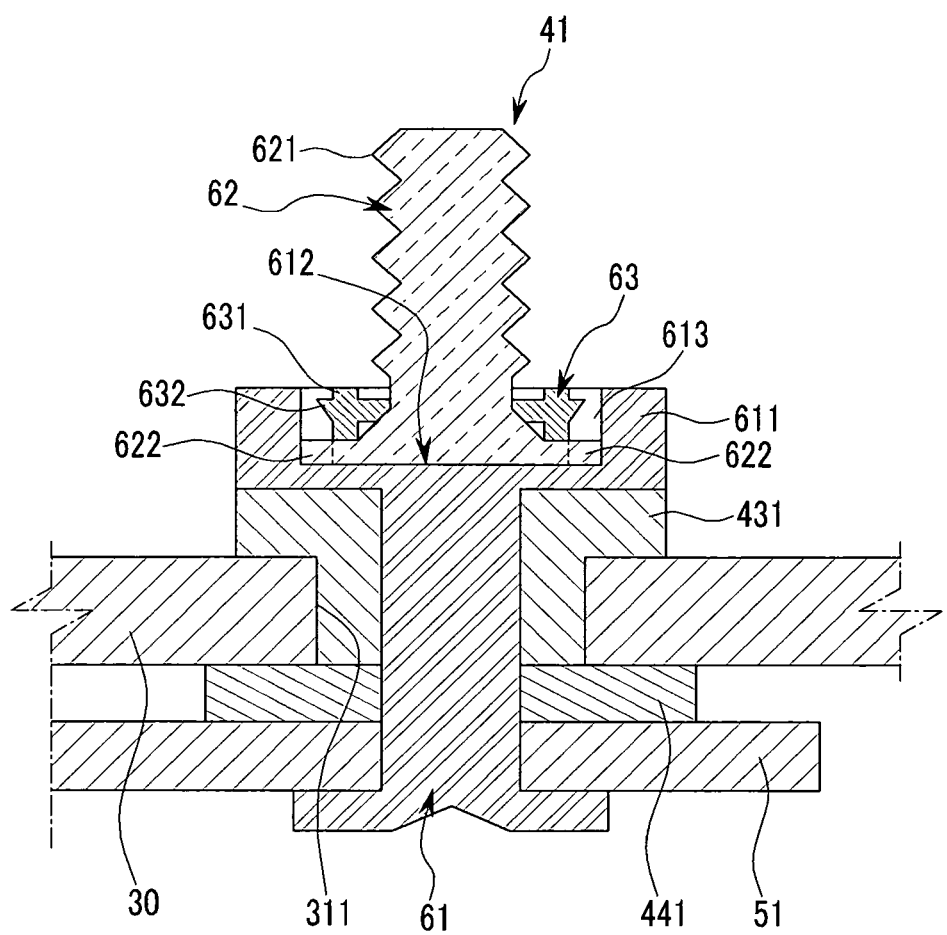
FIG. 4 illustrates an assembled cross-sectional view of FIG. 3 taken along line IV-IV.

FIG. 4 illustrates an assembled cross-sectional view of FIG. 3 taken along line IV-IV. Referring to FIGS. 3 and 4, the first terminal section 61 may be connected to the lead tab 51 of the electrode assembly 10 inside of the cap plate 30. The first terminal section 61 may include a protruding portion 611 that protrudes outwardly from the cap plate 30 and a receiving portion 612 in the protruding portion 611.

For example, the receiving portion 612 may include a cylindrical space that is open at a center of the protruding portion 611 to the outside. The receiving portion 612 may further include a rotation-preventing groove 613 that is further extended outwardly in a radial direction and is concave.

A portion of the second terminal section 62 may be inserted into the receiving portion 612; and another portion may protrude outwardly from the receiving portion 612. The bolt portion 621 may be formed on the protruded portion of the second terminal section 62. A nut (not shown) for fixing the bus bar may be coupled to the bolt portion 621. The second terminal section 62 may include a rotation-preventing projection 622, which may be convex outwardly in a radial direction, to be coupled to the rotation-preventing groove 613.

When the second terminal section 62 is inserted into the receiving portion 612 of the first terminal section 61, the rotation-preventing projection 622 of the second terminal section 62 may be coupled to the rotation-preventing groove 613 of the first terminal section 61. Therefore, even in the event of transformation and operation force resulting from a connection process of the first terminal section 61 and the lead tab 51, the bolt portion 621 and the nut may be stably coupled to each other in the second terminal section 62.

Further, when the bus bar is on the bolt portion 621, which may be fastened to the nut, rotational force between the bolt portion 621 and the nut may be interrupted or compensated for by the rotation-preventing projection 622 and the rotation-preventing groove 613. For example, in spite of a coupling force between the bolt portion 621 and the nut in the second terminal section 62, a connection between the first terminal section 61 and the lead tab 51 may not be influenced thereby.

The plurality of rotation-preventing grooves 613 and rotation-preventing projections 622 may be arranged at regular intervals in a circumferential direction of the receiving portion 612 and may be correspondingly coupled to each other. For example, in the present embodiment, four of the rotation-preventing groove 613 and the rotation-preventing projections 622 may be included. However, 2, 3, 5 or more may be included and/or a concave-convex structure may be utilized to prevent the rotation.

Figure 5:
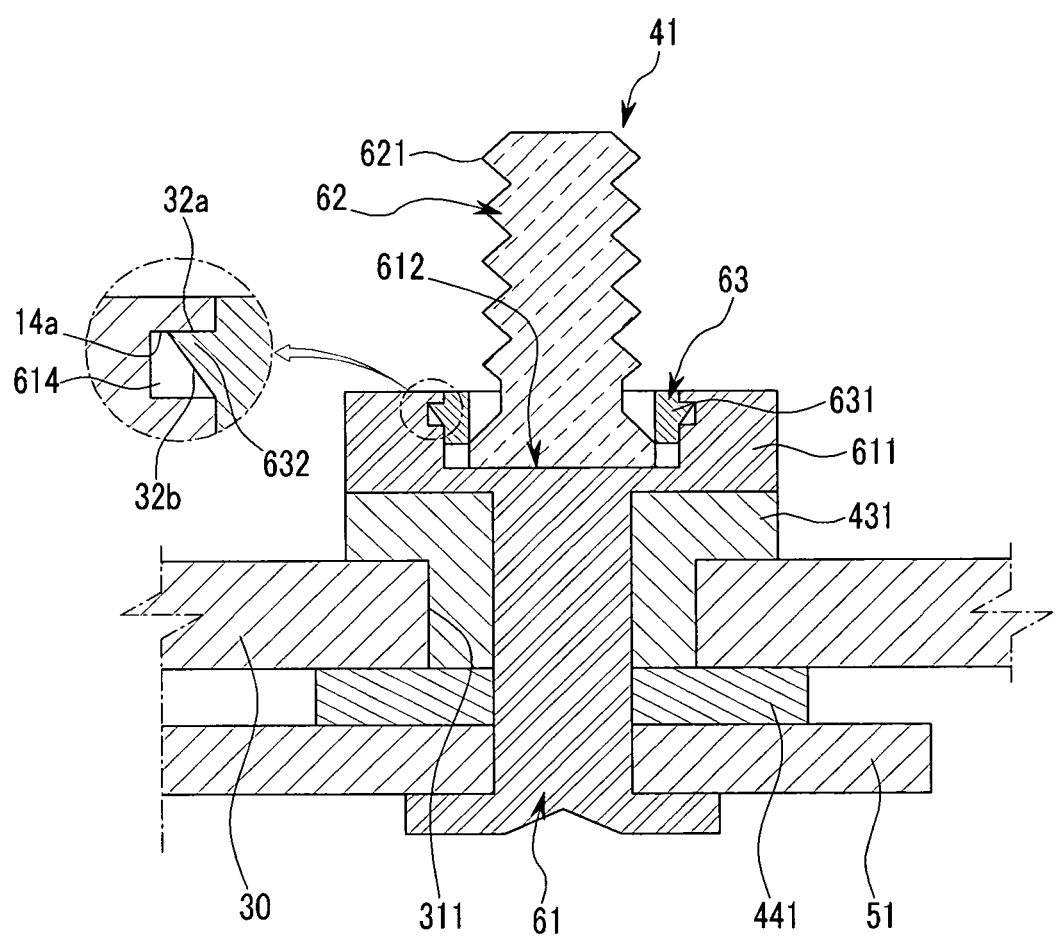
FIG. 5 illustrates an assembled cross-sectional view of FIG. 3 taken along line V-V.

FIG. 5 illustrates an assembled cross-sectional view of FIG. 3 taken along line V-V. Referring to FIGS. 3 to 5, the fastening member 63 may be interposed between an inner peripheral surface of the receiving portion 612 and the second terminal section 62 to fasten the first and second terminals sections 61 and 62, thereby electrically connecting the first and second terminals 61 and 62 to each other.

The first and second terminal sections 61 and 62 may be coupled to each other in x and y-axis directions by the rotation-preventing projection 622 and the rotation-preventing groove 613. In addition, the fastening member 63 may couple the first and second terminal sections 61 and 62 to each other in a z-axis direction. In an implementation, the first and second terminal sections 61 and 62 may be made of a conductive material and the fastening member 63 may be made of a resin injection material.

The fastening member 63 made of the resin injection material may be transformed and coupled between the first and second terminals section 61 and 62 and may rigidly couple both sections to each other. Although not shown, in an implementation, the fastening member 63 may be formed by a snap ring made of a conductive material having elasticity.

For example, the fastening member 63 may include a ring portion 631 that may closely contact the rotation-preventing projection 622 and a fastening protrusion 632 on the ring portion 631. The ring portion 631 may be inserted between the inner peripheral surface of the receiving portion 612 and the second terminal section 62, which may face each other, to press the rotation-preventing projection 622 on a bottom thereof. Accordingly, the second terminal section 62, e.g., the rotation-preventing projection 622, and the first terminal section 61, e.g., the receiving portion 612, may be electrically connected to each other.

The receiving portion 612 may have a fastening groove 614 that is concave in the radial direction of the receiving portion 612 and may correspond to the fastening protrusion 632. When the ring portion 631 of the fastening member 63 is inserted between the inner peripheral surface of the receiving portion 612 and the second terminal section 62, the fastening protrusion 632 may be coupled to the fastening groove 614. Accordingly, the fastening member 63 may be stably positioned between the inner peripheral surface of the receiving portion 612 and the second terminal section 62.

For example, the fastening groove 614 may be continuously formed along a circumference of the inner peripheral surface of the receiving portion 612. The fastening protrusion 632 may be continuously formed on the circumference of the outer peripheral surface of the ring portion 631 and may correspond to the fastening groove 614. In an implementation, the fastening groove 614 may be formed throughout the circumference and the plurality of fastening protrusions 632 may be formed at regular intervals along the circumference (not shown).

Further, the fastening groove 614 may include a horizontal bottom surface 14a that extends outwardly in the radial direction from the inner peripheral surface of the receiving portion 612. The fastening protrusion 632 may include a horizontal top surface 32a that closely contacts the horizontal bottom surface 14a. The fastening protrusion 632 may also include an inclined surface 32b that is inclined toward a lower part of the ring portion 631 from an end of the horizontal top surface 32a. For convenience, the top surface and the bottom surface are described on the basis of the figure.

As described above, the fastening member 63 may be made of a resin injection material. Thus, the fastening protrusion 632 may be easily inserted into the receiving portion 612 due to the inclined surface 32b. In this case, although the fastening protrusion 632 may be partially transformed, the fastening protrusion 632 may be positioned at the fastening groove 614 and may recover to its original form so as to maintain a coupling state to the fastening groove 614.

The horizontal top surface 32a of the fastening protrusion 632 may closely contact the horizontal bottom surface 14a of the fastening groove 614 through surface contact of a large area to thereby increase a fastening force between the fastening member 63 and the receiving portion 612. Further, the surface contact structure between the horizontal top surface 32a and the horizontal bottom surface 14a may maintain the fastening state between the fastening protrusion 632 and the receiving portion 612 as long as the fastening protrusion 632 is not broken.

Referring to FIGS. 2 and 3, the lead tabs 51 and 52 may be connected to the electrode terminals 41 and 42 at one portion or end thereof and may be connected to the uncoated regions 111 and 121 of the electrode assembly 10 at another portion or end thereof.

Hereinafter, another embodiment will be described. The same elements as the previous embodiment will not be described and different elements from the previous embodiment will be described.

Figure 6:
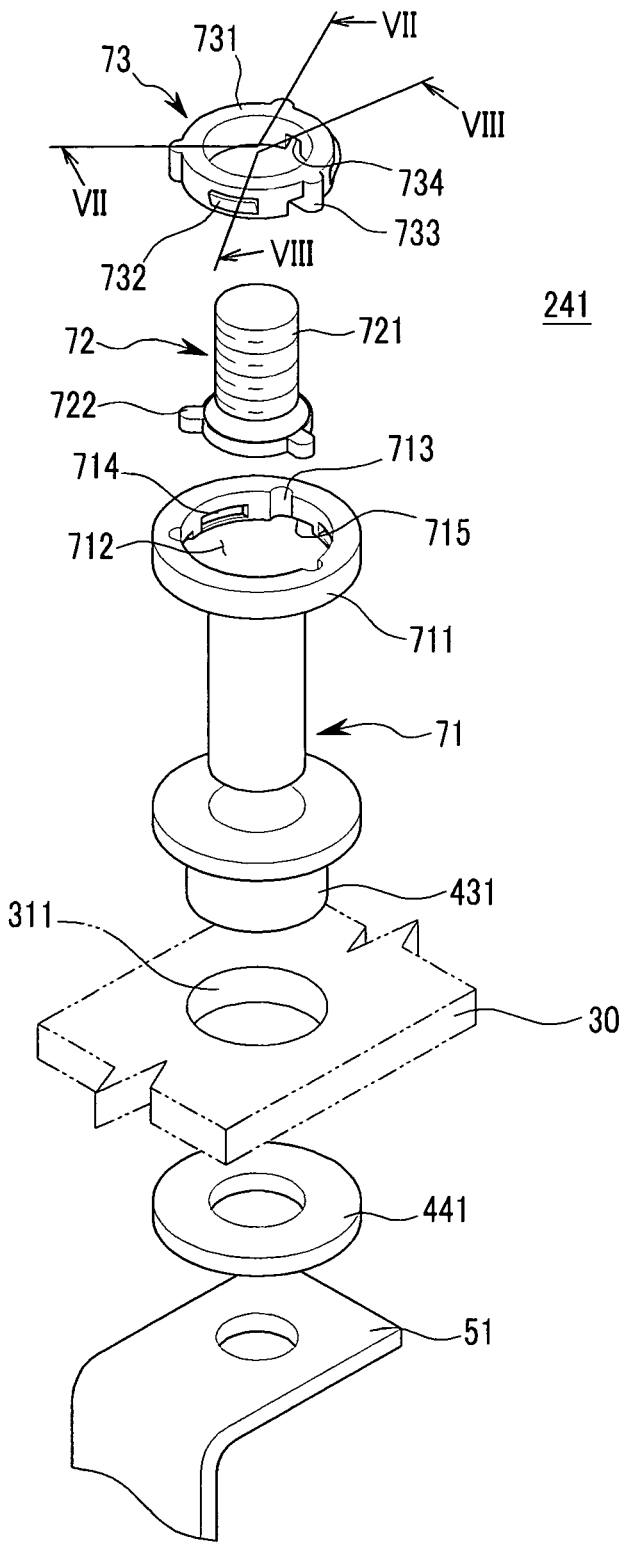
FIG. 6 illustrates an exploded perspective view of an electrode terminal, a cap plate, and a lead tab in a rechargeable battery according to another embodiment.

FIG. 6 illustrates an exploded perspective view of an electrode terminal, a cap plate, and a lead tab in a rechargeable battery according to another embodiment.

In the electrode terminal 41 of the rechargeable battery 100 according to the previous embodiment, the second terminal section 62 may be coupled to and inserted into the first terminal section 61 in the z-axis direction; and the fastening protrusion 632 of the fastening member 63 may be inserted into the fastening groove 614 of the receiving portion 612 and may rotate in the circumferential direction by external force.

In an electrode terminal 241 of the rechargeable battery according to the present embodiment, a second terminal section 72 may be inserted into a first terminal section 71 in a z-axis direction and may rotate in a circumferential direction to be coupled to the first terminal section 71; and a fastening protrusion 732 of a fastening member 73 may be inserted into a fastening groove 714 of a receiving portion 712 and may not rotate in the circumferential direction even if an external force is applied.

Figure 7:
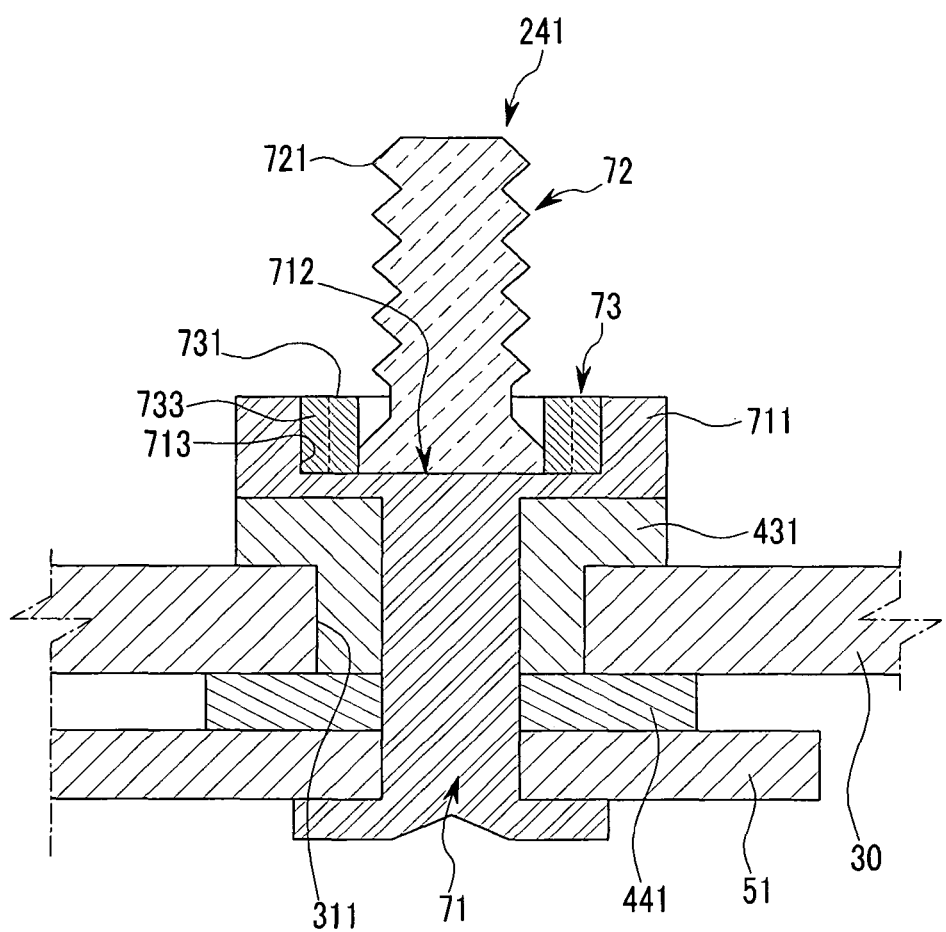
FIG. 7 illustrates an assembled cross-sectional view of FIG. 6 taken along line VII-VII.
Figure 8:
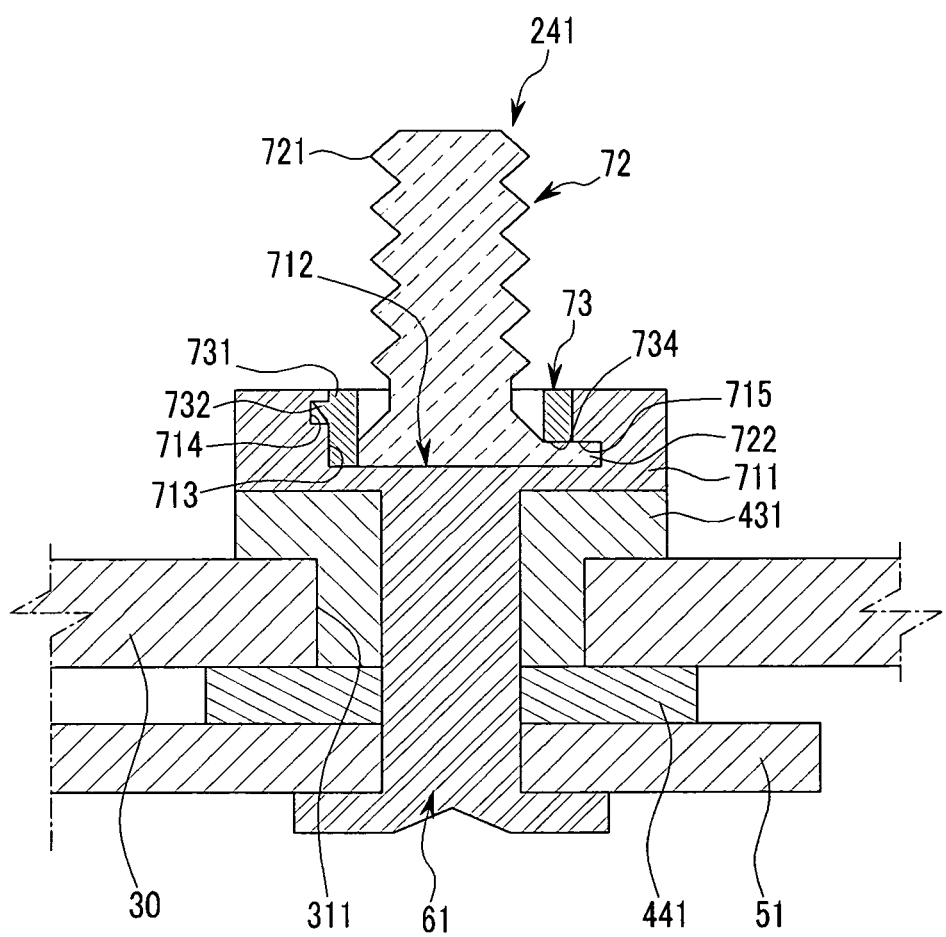
FIG. 8 illustrates an assembled cross-sectional view of FIG. 6 taken along line VIII-VIII.

FIG. 7 illustrates an assembled cross-sectional view of FIG. 6 taken along line VII-VII. FIG. 8 illustrates an assembled cross-sectional view of FIG. 6 taken along line VIII-VIII. Referring to FIGS. 6 to 8, the first terminal section 71 may include a protruding portion 711 that protrudes outwardly from a cap plate 30 and a receiving portion 712 on the protruding portion 711.

The receiving portion 712 may include a rotation-preventing groove 713 that extends outwardly in a radial direction, a fastening groove 714 that is concave in the radial direction of the receiving portion 712, and a separation-preventing groove 715 that extends from the rotation-preventing groove 713 in a circumferential direction. Thus, the second terminal section 72 may be fastened to the first terminal section 71, e.g., the fastening groove 714 may be coupled to the fastening protrusion 732, and the separation-preventing groove 715 may be coupled to a rotation-preventing projection 722 of the second terminal section 72.

One part of the second terminal section 72 may be inserted into the receiving portion 712 and another part may protrude outwardly from the receiving portion 712. A bolt portion 721 may be on a protruded portion of the second terminal section 72. The second terminal section 72 may include the rotation-preventing projection 722 that is convex outwardly in the radial direction and may be coupled to or inserted into the rotation-preventing groove 713. For example, three rotation-preventing grooves 713 and three rotation-preventing projections 722 may be arranged at regular intervals in the circumferential direction of the receiving portion 712 and may be correspondingly coupled to each other.

The fastening member 73 may include a ring portion 731 that closely contacts the rotation-preventing projection 722, a fastening protrusion 732 that protrudes from the ring portion 731 to be coupled to the fastening groove 714 of an inner peripheral surface of the receiving portion 712 facing the ring portion 731, and an auxiliary rotation-preventing projection 733 that protrudes from the ring portion 731 to be coupled to the rotation-preventing groove 713.

The fastening groove 714 and the rotation-preventing groove 713 may be alternately disposed in the circumferential direction on the inner peripheral surface of the receiving portion 712. The fastening groove 714 may be formed in the circumferential direction at a center of a height direction (z-axis direction) of the receiving portion 712 to correspond to the fastening protrusion 732; and the rotation-preventing groove 713 may be formed in the height direction of the receiving portion 712.

For example, the plurality of fastening protrusions 732 and fastening grooves 714 may correspond to each other. For example, the plurality of fastening grooves 714 may be arranged on the inner peripheral surface of the receiving portion 712 at regular intervals; and the plurality of fastening protrusions 732 may be formed along the circumference on the outer peripheral surface of the ring portion 731 to correspond to the fastening grooves 714. The fastening groove 714 and the fastening protrusion 732 may have about the same length in the circumferential direction to be coupled to each other. In an implementation, the fastening protrusion may be shorter than the fastening groove (not shown).

The rotation-preventing groove 713 may guide insertion of the rotation-preventing projection 722 of the second terminal section 72, may guide insertion of the auxiliary rotation-preventing projection 733 of the fastening member 73, and may be coupled to the auxiliary rotation-preventing projection 733 when insertion is completed. The auxiliary rotation-preventing projection 733 may be coupled to the rotation-preventing groove 713 to prevent the fastening member 73 from rotating in the receiving portion 712. In an implementation, the rotation-preventing grooves may be formed on the inner peripheral surface at regular intervals; and the fastening groove may be formed throughout the circumferential direction to cross the rotation-preventing groove (not shown).

The ring portion 731 may further include a projection receiving groove 734 so that the rotation-preventing projection 722 may rotate and be inserted into the separation-preventing groove 715. The projection receiving groove 734 may correspond to the separation-preventing groove 715.

The second terminal section 72 may be inserted into the receiving portion 712 of the first terminal section 71 and may be rotated at a predetermined angle. Then, the fastening member 73 may fasten both sections 71 and 72 to each other. As a result, the electrode terminal 241 may be completed and assembled. The separation-preventing groove 715 of the first terminal section 71 and the projection receiving groove 734 of the fastening member 73 may fix a position of the rotation-preventing projection 722 to prevent the second terminal section 72 from being separated in the z-axis direction.

The embodiments provide a rechargeable battery having advantages of overcoming processing constraints of an electrode terminal and reducing processing cost by ensuring the quality of the electrode terminal.

According to the embodiments, it is possible to separate parts having fastening structures of different properties by fastening first and second terminals parts using a fastening member to form an electrode terminal.

For example, the electrode terminal may be formed by fastening the second terminal section to the first terminal section that is connected to a lead tab by caulking, riveting, or welding inside of a cap plate, thereby overcoming constraints that accompany processing the electrode terminal and hence also reducing quality deviations. Accordingly, the processing cost of the electrode terminal may be reduced.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A rechargeable battery, comprising:
an electrode assembly including a positive electrode, a negative electrode, and a separator therebetween;
a case housing the electrode assembly;
a cap plate sealing an opening of the case; and
an electrode terminal installed in the cap plate,
wherein the electrode terminal includes:
a first terminal section in a terminal hole of the cap plate, the first terminal section being connected to the electrode assembly in the case and including a protruding portion that protrudes outwardly from the cap plate, the protruding portion having a receiving portion therein,
a second terminal section in the receiving portion, the second terminal section protruding outwardly from the receiving portion, and
a fastening member between an inner peripheral surface of the receiving portion and the second terminal section, the fastening member fastening the first terminal section and the second terminal section to each other.

2. The rechargeable battery as claimed in claim 1, wherein:
the receiving portion is formed by a cylindrical space,
the receiving portion includes a concave rotation-preventing groove protruding outwardly in a radial direction, and
the second terminal section includes a rotation-preventing projection, the rotation-preventing projection being convex outwardly in the radial direction and being coupled to the rotation-preventing groove.

3. The rechargeable battery as claimed in claim 2, wherein:
the receiving portion includes a plurality of the rotation-prevention grooves,
the second terminal section includes a plurality of the rotation-preventing projections, and
the plurality of rotation-preventing grooves and rotation-preventing projections are arranged at regular intervals along a circumferential direction of the receiving portion and are correspondingly coupled to each other.

4. The rechargeable battery as claimed in claim 2, wherein the fastening member includes:
a ring portion that closely contacts the rotation-preventing projection, and
a fastening protrusion that protrudes from the ring portion, the fastening protrusion being coupled to a fastening groove on the inner peripheral surface of the receiving portion, which inner peripheral surface faces the ring portion.

5. The rechargeable battery as claimed in claim 4, wherein:
the fastening groove includes a horizontal bottom surface that extends outwardly in the radial direction from the inner peripheral surface of the receiving portion, and
the fastening protrusion includes:
- a horizontal top surface that closely contacts the horizontal bottom surface of the fastening groove, and
- an inclined surface that is inclined toward a lower part of the ring portion from an end of the horizontal top surface.

6. The rechargeable battery as claimed in claim 4, wherein:
the fastening groove extends continuously along a circumference of the inner peripheral surface of the receiving portion, and
the fastening protrusion extends continuously along a circumference of an outer peripheral surface of the ring portion.

7. The rechargeable battery as claimed in claim 4, wherein:
the first terminal section and the second terminal section are made of a conductive material, and
the fastening member is made of a resin injection material.

8. The rechargeable battery as claimed in claim 2, wherein the fastening member includes:
a ring portion that closely contacts the rotation-preventing projection,
a fastening protrusion that protrudes from the ring portion, the fastening protrusion being coupled to a fastening groove on the inner peripheral surface of the receiving portion, which inner peripheral portion faces the ring portion, and
an auxiliary rotation-preventing projection that protrudes from the ring portion, the auxiliary rotation-preventing projection being coupled to the rotation-preventing groove.

9. The rechargeable battery as claimed in claim 8, wherein:
the receiving portion includes a plurality of the rotation-prevention grooves and a plurality of the fastening grooves, and
the fastening grooves and the rotation-preventing grooves are alternately disposed in along a circumferential direction of the receiving portion.

10. The rechargeable battery as claimed in claim 9, wherein:
the receiving portion further includes a separation-preventing groove that extends from the rotation-preventing groove along the circumferential direction, and
the ring portion includes a projection receiving groove that contacts the rotation-preventing projection to correspond to the separation-preventing groove so that the rotation-preventing projection is inserted into the separation-preventing groove.

11. The rechargeable battery as claimed in claim 9, wherein the ring portion includes a plurality of fastening protrusions, the plurality of fastening protrusions being on an outer circumferential surface of the ring portion and corresponding to the fastening grooves.

12. The rechargeable battery as claimed in claim 11, wherein:
the fastening groove includes a horizontal bottom surface extending outwardly in the radial direction from the inner peripheral surface of the receiving portion,
the fastening protrusion includes:
- a horizontal top surface that closely contacts the horizontal bottom surface, and
- an inclined surface that is inclined toward a lower part of the ring portion from an end of the horizontal top surface, and
the fastening groove and the fastening protrusion have about the same length in the circumferential direction.

13. The rechargeable battery as claimed in claim 1, further comprising:
an outer insulator between an outer part of the first terminal section and the cap plate; and
an inner insulator between a lead tab of the electrode assembly connected to an inner part of the first terminal section and the cap plate.

\* \* \* \* \*